United States Patent [19]

Inoue et al.

[11] Patent Number: 4,468,092
[45] Date of Patent: Aug. 28, 1984

[54] REAR PROJECTION SCREEN

[75] Inventors: Masao Inoue; Shingo Suzuki, both of Tokyo, Japan

[73] Assignee: Mitsubishi Rayon Co., Ltd., Tokyo, Japan

[21] Appl. No.: 467,509

[22] Filed: Feb. 18, 1983

[30] Foreign Application Priority Data

Feb. 25, 1982 [JP] Japan .................................. 57-29178

[51] Int. Cl.³ ............................................ G03B 21/60
[52] U.S. Cl. .................................................. 350/128
[58] Field of Search ............................. 350/127–129, 350/126

[56] References Cited

U.S. PATENT DOCUMENTS

| | | | |
|---|---|---|---|
| 2,510,344 | 6/1950 | Law | 350/128 |
| 2,529,701 | 11/1950 | Maloff | 350/128 |
| 2,738,706 | 3/1956 | Thompson, Jr. | 350/127 |
| 2,870,673 | 1/1959 | Schwesinger | 350/128 |
| 3,218,924 | 11/1965 | Miller | 350/129 |
| 3,257,900 | 6/1966 | Goodbar et al. | 350/128 |
| 3,279,314 | 10/1966 | Miller | 350/128 |
| 3,578,841 | 5/1971 | Elmer | 350/127 |
| 3,830,556 | 8/1974 | Bratkowski | 350/128 |
| 4,379,617 | 4/1983 | Funakoshi et al. | 350/126 |
| 4,418,986 | 12/1983 | Yata et al. | 350/128 |
| 4,469,402 | 9/1984 | Yata et al. | 350/128 |

FOREIGN PATENT DOCUMENTS

| | | | |
|---|---|---|---|
| 180418 | 12/1954 | Austria | 350/127 |
| 813015203 | 10/1981 | European Pat. Off. | |
| 98590 | 5/1921 | Switzerland | |

Primary Examiner—Richard A. Wintercorn
Attorney, Agent, or Firm—Brumbaugh, Graves, Donohue & Raymond

[57] ABSTRACT

A rear projection screen suitable for use as, for example, a screen for video projector. The rear projection screen is provided with a lenticulated surface at least one the viewer's side thereof. The lenticulated surface is constituted by a plurality of lenticule units each having total reflection surfaces on both inclined flanks thereof and a plurality of curved surface portions between both inclined flanks. The arrangement is such that a part of the light rays impinging from the projection side of the screen are reflected by the total reflection surfaces and then pass through the curved surface portions of each lenticule unit. Another type of lens may be formed between each of the adjacent lenticule units.

21 Claims, 23 Drawing Figures

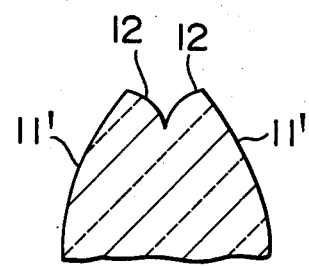
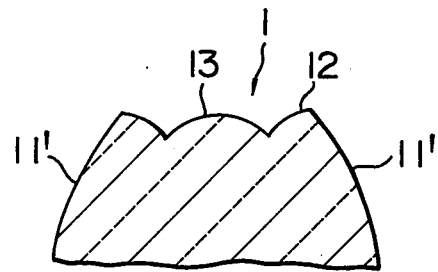
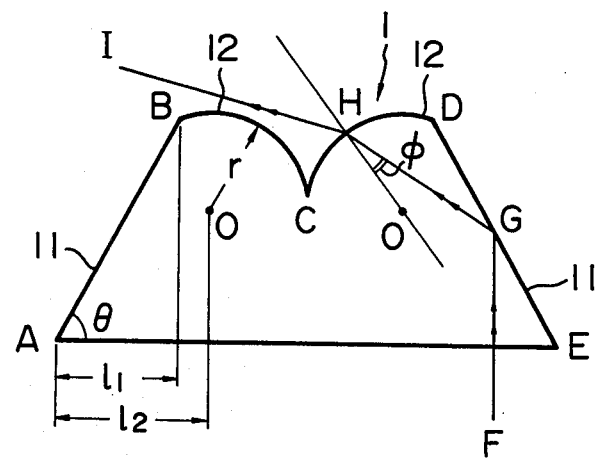

$G = \dfrac{\text{FOOT LAMBERT}}{\text{FOOT CANDLE}}$

ANGLE OF FIELD VIEW $G = \dfrac{\text{FOOT LAMBERT}}{\text{FOOT CANDLE}}$ $G = \dfrac{\text{FOOT LAMBERT}}{\text{FOOT CANDLE}}$

ANGLE OF FIELD OF VIEW

REAR PROJECTION SCREEN

BACKGROUND OF THE INVENTION

The present invention relates to a rear projection screen suitable for use as, for example, a screen for video projectors and, more particularly, to a rear projection screen having a greater angular field of vision on the viewing side and an increased brightness.

Rear projection screens have been widely available for video projectors, microfilm readers and computer display systems, and various studies and attempts have been made for improving the light transmitting characteristics of the rear projection screen to attain a greater angular field of vision. One of the measures for achieving such aim is to use, solely or in combination with a lens or a diffusion plate, a lenticulated surface having a multiplicity of minute cylindrical lenses (lenticules) arranged contiguously.

The screen having the lenticulated surface is effective in diffusing the light impinging thereon. More specifically, a lenticulated surface having a multiplicity of minute vertically extending cylindrical lenses arranged contiguously on a vertical plane diffuses the light laterally, while the lenticulated surface having a multiplicity of minute horizontally extending cylindrical lenses arranged contiguously on a vertical plane diffuses the light longitudinally. When this lenticulated surface is used as a screen, the maximum diffusion angle is varied largely depending on whether the lenticulated lens faces the incident light, i.e. the light source, or the viewer. Namely, as is well known to those skilled in the art, it is possible to obtain a greater diffusion angle when the surface faces the light source than when the same faces the viewer.

In general, however, there is a practical limit in the angular field of vision if each lenticular lens unit has a simple circular cross-section, even when the lenticulated surface is directed towards the viewer. This is attributable to the fact that the angular field of vision is restricted in order to prevent a large loss of light in the portions of large incidence angle in accordance with the condition of critical angle and Fresnel's formula, when the light impinges from the projecting side as a parallel light beam.

More specifically, assuming here that a parallel light beam L impinges as illustrated in FIG. 19, total reflection takes place when the following condition is met:

$$n \cdot \sin\theta = \sin\phi = 1$$

where n represents the refractive index of the medium.

Thus, the light impinging at an angle $\theta$ greater than this incident angle is not transmitted to the viewer's side.

The reflection factor r at the interface in the Fresnel's formula is defined as follows.

$$r = \frac{1}{2}\left(\frac{\sin^2(\phi - \theta)}{\sin^2(\phi + \theta)} + \frac{\tan^2(\phi - \theta)}{\tan^2(\phi + \theta)}\right)$$

This reflection factor r takes a large value when the incidence angle is near the critical angle.

As understood from the foregoing description, at the lenticulated surface consisting of lenticules having simple circular cross-section, the quantity of light is reduced almost to zero in the region of about 30° from the center as shown in FIG. 20, and the image cannot be observed in the region of angular field of vision exceeding the above-mentioned angle.

It has been proposed to make the lenticulated surface have a parabolic cross-sectional shape. A too high quality cross-sectional shape of the lenticulated surface, however, takes much time and labor and, hence, increases the cost in the manufacture of the mold. It is difficult to produce the screen at a high reproducibility of the screen shape, even at the cost of much labor and time employing an expensive mold.

SUMMARY OF THE INVENTION

Accordingly, an object of the invention is to provide a rear projection screen having a large angular field of vision.

According to one aspect of the invention, there is provided a rear projection screen provided at at least the viewer's side thereof with a lenticulated surface, each of the lenticules constituting the lenticulated surface is provided with total reflection surfaces on both inclined flanks thereof, a plurality of curved surface portions being formed between both inclined flanks and a part of the light impinging from the projection side being totally reflected by the total reflection surfaces and then passing through the curved surface portions.

According to a second aspect of the invention, there is provided a rear projection screen provided at at least the viewer's side thereof with a lenticulated surface, each of the lenticules constituting the lenticulated surface is provided with total reflection surfaces respectively on both flanks thereof, a plurality of curved surface portions being formed between both inclined flanks and a part of the light impinging from the projection side being totally reflected by the total reflection surfaces and then passing through the curved surface portions, wherein another lens is disposed between two adjacent lenticules.

These and other objects, features and advantages of the invention will become clear from the following description of the preferred embodiment taken in conjunction with the accompanying drawings.

BRIEF DESCRIPTION OF THE DRAWINGS

FIGS. 9 and 10 are sectional views of essential portions of embodiments having curved total reflection surfaces;

FIG. 11 is an illustration of the light transmitting characteristics of each lenticule in the rear projection screen of the invention;

DESCRIPTION OF THE PREFERRED EMBODIMENTS

Before the embodiments of the present invention are described, the general arrangement of a projection system using a rear projection screen embodying the invention will be explained with specific reference to FIG. 21.

Figure 21:
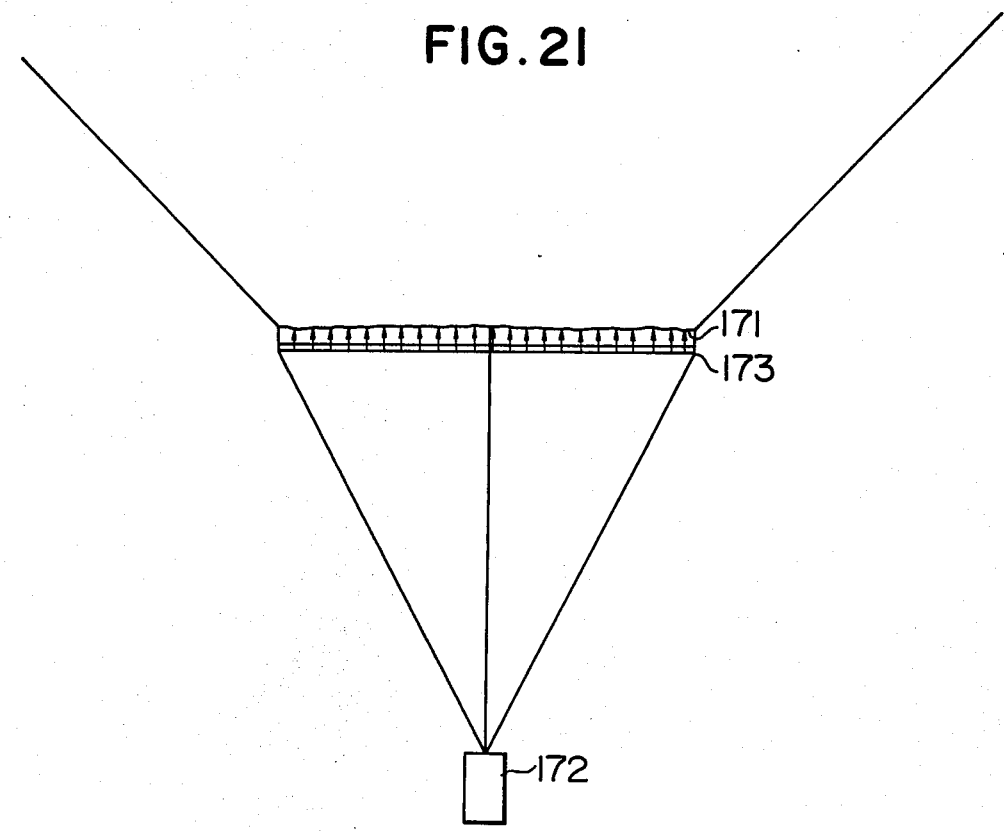
FIG. 21 is a plan view illustrating a general arrangement of a projection system using the rear projection screen of the present invention.

Referring to FIG. 21, light rays diverging from a projector 172 impinge upon the rear surface of a rear projection screen 171 through a Fresnel lens 173 which converts the diverging light rays into parallel ones. The light rays transmitted through the medium of the rear projection screen 171 in parallel relation are dispersed from the front surface of the rear projection screen 171 in a suitable viewing angle.

Figure 1:
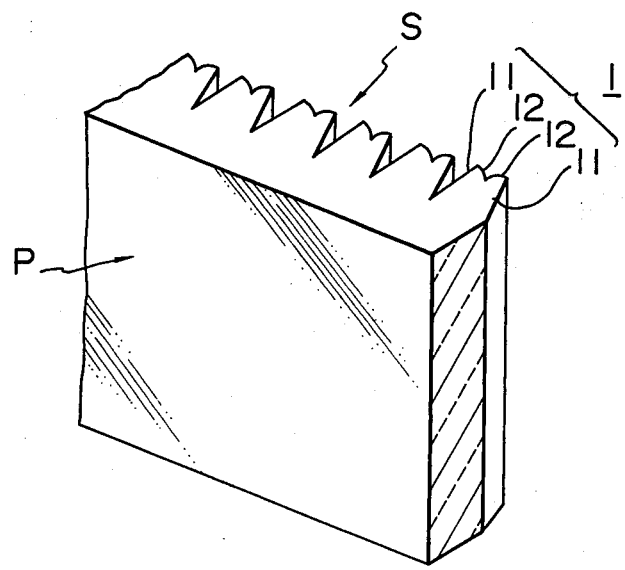
FIG. 1 is a perspective view of a rear projection screen in accordance with an embodiment of the first aspect of the invention.
Figure 2:
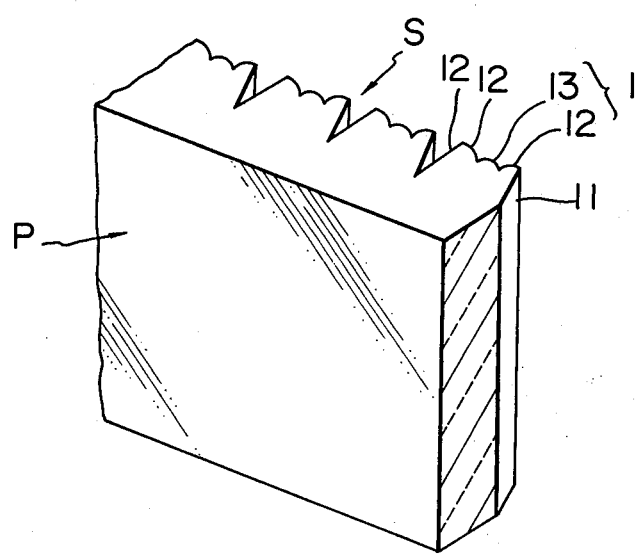
FIG. 2 is a perspective view of a rear projection screen in accordance with another embodiment of the first aspect of the invention.
Figure 3:
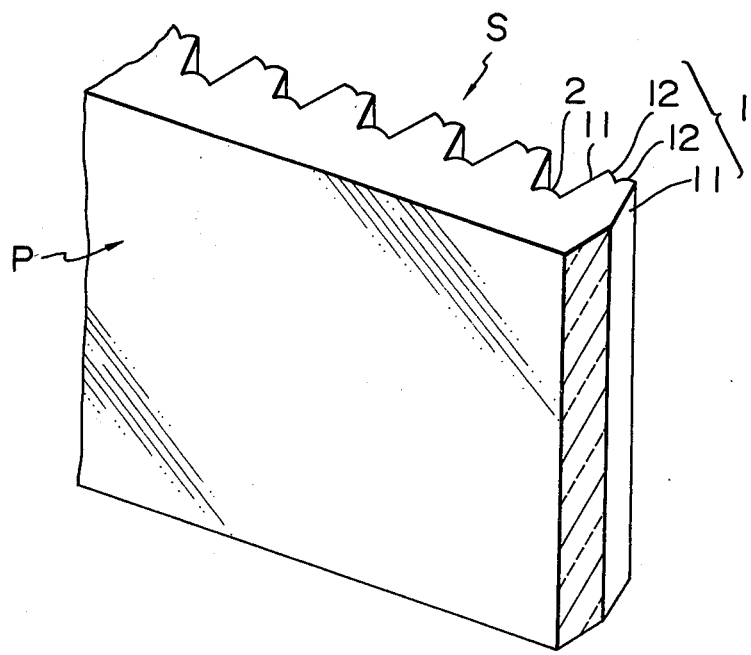
FIG. 3 is a perspective view of a rear projection screen in accordance with an embodiment of the second aspect of the invention.

FIGS. 1 through 3 are perspective views of rear projection screens embodying the present invention. More specifically, FIGS. 1 and 2 show rear projection screens in accordance with a first aspect of the invention, while FIG. 3 shows a rear projection screen in accordance with a second aspect of the invention. In these Figures, reference numeral 1 designates a lenticule unit provided on its both inclined flanks with total reflection surfaces 11, 11, as well as a plurality of curved surface portions 12, 12 between both inclined flanks, which are contiguous to the ends of the associated total reflection surfaces 11, 11. In the embodiment shown in FIG. 1, a lenticulated surface consisting solely of lenticule units 1 is formed on the viewer's side of the rear projection screen. The light transmitting characteristics of the lenticule unit 1 will be explained later.

FIG. 2 shows another embodiment of the first aspect of the invention in which a convex lens 13 is formed between the curved surface portions 12, 12 of each lenticule unit. A lenticulated surface consisting solely of the lenticule units 1 is formed on the viewer's side S of the rear projection screen also in this embodiment. This arrangement provides blunter tops of the lenticule units to offer a more comfortable feel to the touch by hand.

FIG. 3 shows an embodiment in accordance with the second aspect of the invention in which another lens 2 is disposed between adjacent lenticule units 1. Namely, the lenticule units 1 and the lenses 2 are arranged in an alternate repetition. A symbol "P" represents the projection side of the rear projection screen.

Figure 4:
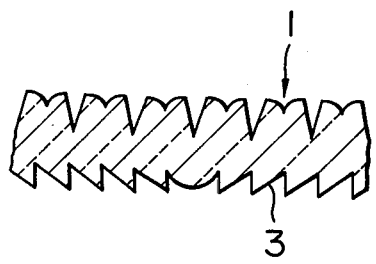
FIG. 4 is a sectional view of a rear projection screen of the type shown in FIG. 1, wherein a Fresnel lens is formed on the projection side of the rear projection screen.
Figure 5:
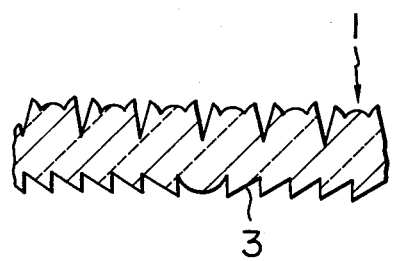
FIG. 5 is a sectional view of a rear projection screen of the type shown in FIG. 2, wherein a Fresnel lens is formed on the projection side of the rear projection screen.
Figure 6:
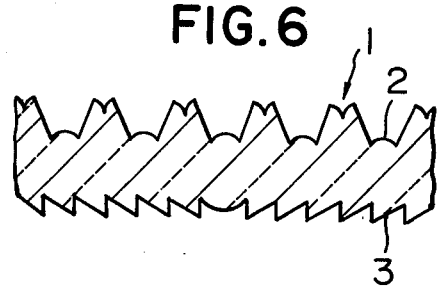
FIG. 6 is a sectional view of a rear projection screen of the type shown in FIG. 3, wherein a Fresnel lens is formed on the projection side of the rear projection screen.

According to the invention, a lenticulated surface consisting of lenticule units 1 or a lenticulated surface consisting of lenticule units 1 and lenses 2 is formed on at least the viewer's side S of the rear projection screen. To attain superior effect, it is advisable to form a Fresnel lens 3 on the projection side P as in the case of the embodiments shown in FIG. 4 thru 6. Morespecifically, FIG. 4 shows a rear projection screen which is produced by forming a Fresnel lens 3 on the projection side P of the rear projection screen shown in FIG. 1, while FIG. 5 shows a rear projection screen which is produced by forming a Fresnel lens 3 on the projection side P of the rear projection screen shown in FIG. 2. Similarly, FIG. 6 shows a rear projection screen which is produced by forming a Fresnel lens 3 on the projection side P of the rear projection screen shown in FIG. 3. In each of the embodiments shown in FIGS. 4 thru 6, a circular Fresnel lens is most suitable used as the Fresnel lens 3. The focal distance f of the circular Fresnel lens varies depending on the purpose of use of the screen but typically ranges between 1.0 and 1.2 m in the case of a rear projection screen for video projector of 40 to 50 inches.

Figure 7:
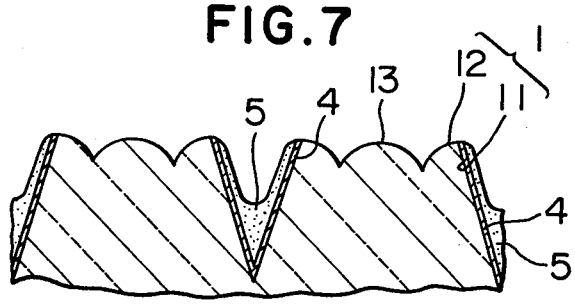
FIG. 7 is a sectional view of a part of a part of an embodiment in which an external light absorption layer is formed on the total reflection surface.

FIG. 7 shows an embodiment improved to provide a higher contrast of the image on the rear projection screen. Namely, in this embodiment, an external light absorbing layer 5 is formed on each total reflection surface 11. A reflecting layer 4 is formed beforehand in order to minimize the absorption loss in the external light absorption layer 5. According to this arrangement, it is possible to make an efficient use of the total reflection surface 11 which does not directly transmit the light rays to the viewer's side. Although the embodiment shown in FIG. 7 is based upon the embodiment shown in FIG. 2, it will be clear to those skilled in the art that the same improvement can be achieved also with other embodiments.

Figure 8A:
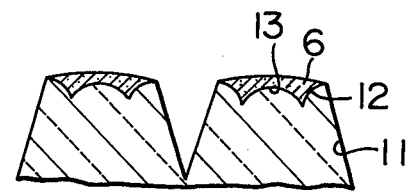
FIGS. 8A, 8B and 8C are partial sectional views to show a process for manufacturing the screen shown in FIG. 7.
Figure 8B:
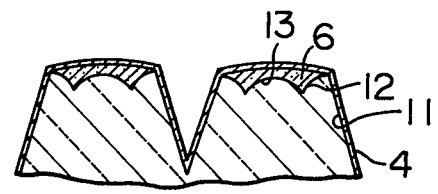
Figure 8C:
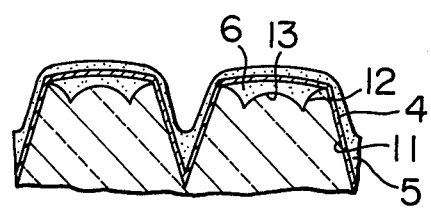

An explanation will be made hereinunder as to an example of the process for producing a rear projection screen having improved contrast, with specific reference to FIGS. 8A, 8B and 8C. As the first step of the process, a masking layer 6 is formed on the light-transmitting portion including a plurality of curved surface portions 12 and the convexed lens 13, as shown in FIG. 8A. The masking layer 6 has to be removed later so that it is formed by application of water soluble separable paint or a paint soluble to acid, alkali or a suitable solvent. Then, as shown in FIG. 8B, a reflecting layer 4 of an evaporated metal film or the like is formed over the entire area. Then, an external light absorption layer 5 is formed by applying, for example, a light absorbing paint. Then, the masking layer 6 is removed together with the corresponding parts of the reflecting surface 4 and the external light absorption layer 5 by a chemical or a physical method thereby to form a screen as shown in FIG. 7.

FIGS. 9 and 10 show different embodiments of the invention in which the total reflection surfaces 11' on each lenticule 1 are curved to convex towards the outside. More specifically, the embodiment shown in FIG. 9 is based on the embodiment shown in FIG. 1, while the embodiment shown in FIG. 10 is based on the embodiment shown in FIG. 2. The curved total reflection surface 11' permits an easy control of the distribution of the light reflected by the total reflection surface 11' and emitted to the viewer's side, as compared with a linear or flat total reflection surface.

As has been described, the rear projection screen of the invention is constituted by lenticule units 1 each of which has total reflection surfaces 11 on its both inclined flanks and a plurality of curved surface portions 12 between both inclined flanks. Hereinafter, an explanation will be made as to the light transmitting characteristics of this lenticule unit 1 with specific reference to FIG. 11.

FIG. 11 shows a lenticule unit 1 having total reflection surfaces 11 and curved surface portions 12. The configuration of this lenticule unit 1 is defined by the factors such as overall pitch $\overline{AE}$, inclination $\theta$ of the total reflection surface 11, lenth $\overline{AB} \times \cos\theta$ of the linear portion $l_1$, distance $l_2$ between the end A of the total reflection surface 11 and the center 0 of the curved surface portion 12, and the radius r of curvature of the curved surface portion 12.

Preferably, the angle $\theta$ is sufficiently greater than the angle at which the parallel light rays are totally reflected, i.e. the critical angle. More specifically, it is preferred that the following condition is met:

$$\sin\theta > 1/n$$

where n represents refractive index.

For instance, when the refractive index n is 1.49 as is the case of acrylic resin, the angle $\theta$ preferably takes a value ranging between 65° and 80°. This is because the angle $\theta$ should be greater than 65° for making the total reflection factor as great as possible, while a large value of the angle $\theta$ approaching 90° is accompanied by restriction or difficulty in fabrication.

Figure 12:
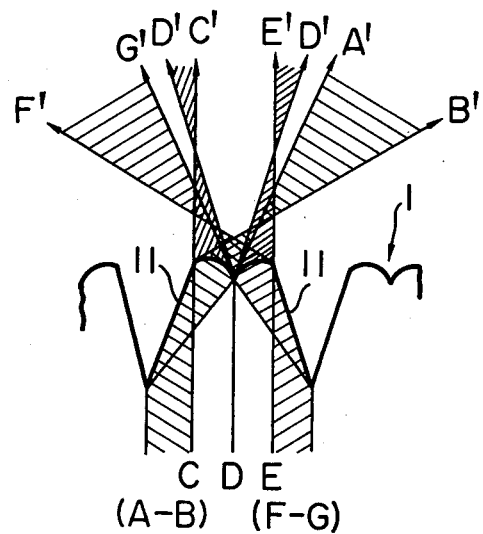
FIG. 12 is an illustration of the light transmitting characteristics of a rear projection screen in accordance with the invention.

The light rays impinging upon the total reflection surface 11 run as indicated by F, G, H and then I. The light rays naturally pass through portions where the loss of light quantity is small and reach the portion where the angular field of vision is large, unless the angle $\phi$ is especially large. In order that the light rays reflected by the total reflection surface 11 are effectively diffused past the curved surface portion 12, it is desirable to reduce the radius r of curvature of the curved surface portion 12 and, at the same time, to increase the value of the ratio pitch/r at the curved surface portion 12. For instance, a satisfactory result is obtained when the sum of the pitches of both curved surface portions 12 takes a value amounting to about 40 to 70% of the pitch of the lenticule unit 1 while the ratio pitch/r takes a value ranging between 1.3 and 2.0. Thus, the light rays impinging upon the total reflection surface are spread over the area where the angular field of vision is large. However, the light rays directly impinging upon the curved surface portion 12 are diffused over the area of small angular field of vision as in the case of ordinary cylindrical lenticules. FIG. 12 illustrates the overall condition of diffusion of light rays. The light rays impinging upon the areas A-B and F-G are totally reflected by the total reflection surfaces 11 and reach the areas A'-B' and F'-G' where the angular field of vision is large, past the curved surface portions. Meanwhile, the light rays directly impinging upon the curved surface portions, i.e. the light rays coming through the areas C-D and D-E reach the areas of small angular field of vision such as areas C'-D' and D'-E', in accordance with the Snell's law of refraction. Therefore, in the rear projection screen of the invention having the lenticulated surface constituted by lenticules having heretofore described construction, it is possible to obtain a uniform distribution of light quantity over a wide angular field of vision.

If the light quantity is insufficient in the area of small angular field of vision, i.e. in the area around the center of the screen, in the embodiment shown in FIG. 12, it is advisable to form a convex lens portion 13 between adjacent curved surface portions 12, 12 as shown in FIG. 2. The convexed lens 13 may or may not be circular. When the circular form is adopted, a uniform and wide distribution of light quantity is obtained by selecting the ratio pitch/r of the lens portion 13 to range between 1.4 and 1.7. From the same point of view, it is possible to dispose an ordinary circular lens 2 between adjacent lenticule units as shown in FIG. 3. In such a case, the circular lens 2 may be either a convex lens or a convave lens.

Acrylic resins can be most suitably used as the material of the rear projection screen of the invention, because the acrylic resins are most superior from the view points of optical properties and formability. The use of acrylic resins, however, is not essential and the rear projection screen of the invention can be formed from other materials such as vinyl chloride resins, polycarbonate resins, olefin resins, styrene resins and so forth by various forming methods such as extrusion, heat press and injection molding.

According to the invention, it is possible to take a suitable measure for improving the light diffusion characteristics of the rear projection screen. Namely, as the measure for improving the light diffusion characteristics, it is possible to uniformly mix and disperse in the synthetic resin such as acrylic resin constituting the medium, one or more of diffusion materials which is not dissolved in nor chemically reactable with the medium resin in liquid state, such as $SiO_2$, $CaCO_3$, $Al_2O_3$, $TiO_3$, $BaSO_4$, $ZnO$, $Al(OH)_3$, powdered glass or an organic diffusion agent. Alternatively, it is possible to form a layer containing such diffusion materials. It is also effective to form a fine mat surface on the projection side P and/or the viewer's side S. By taking such a measure, it is possible to improve the light diffusion characteristics in both of horizontal and vertical directions and, hence, to further uniformize the diffusion of light.

Practical examples of the invention will be described hereafter.

EXAMPLE 1

Figure 13:
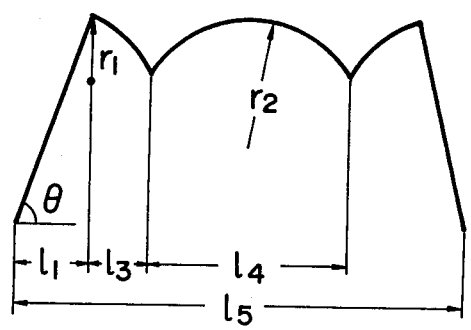
FIG. 13 is an illustration of the shape of lenticules in the first embodiment.

A sheet of acrylic resin of 3 mm thick was formed from an acrylic resin having a refractive index of 1.49 as the material, containing therein of $SiO_2$ as a light diffusion agent. the sheet was then sandwiched between a mold part having a Fresnel lens surface of a focal distance f of 1.1 m and another mold part shaped to provide lenticule units as shown in FIG. 13, and was heat-pressed at a temperature of 180° C. under a pressure of 40 Kg/cm². As a result, a rear projection screen of a shape substantially identical to that shown in FIG. 5 was obtained. The major dimensions of this rear pojection screen with reference to FIG. 13 were as follows: angle $\theta=70°$, radius $r_1$ of curvature=0.17 mm, radius $r_2$ of curvature=0.35 mm, length $l_1=0.2$ mm, length $l_3=0.15$ mm, length $l_4=0.5$ mm, length $l_5=1.2$ mm, ratio pitch/$r_1$ at curved surface portion=1.76 and ratio pitch/$r_2=1.43$.

Figure 14:
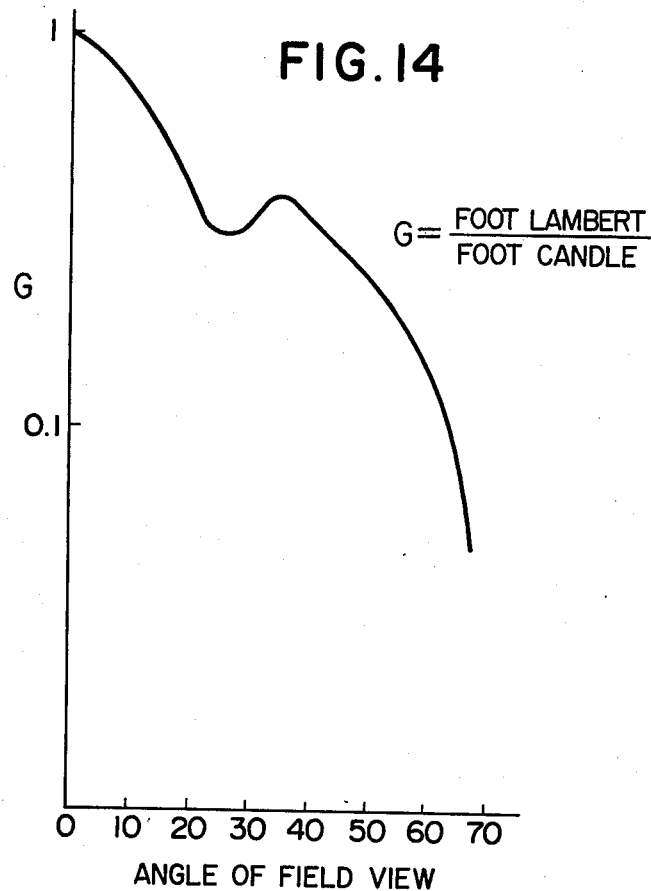
FIG. 14 is a graph showing the result of evaluation of the performance of the rear projection screen of the first embodiment.

FIG. 14 shows the result of evaluation of the light transmission characteristics of the thus produced rear projection screen. From this Figure, it will be seen that, in this rear projection screen, the angle value $\beta$ of about 30° is presented by the total reflecting surfaces and the angular field of vision is as large as 60°, although a slight reduction in the light quantity takes place in the region of angular field of vision around 25°.

Thus, the rear projection screen of Example 1 showed excellent light transmitting characteristics.

EXAMPLE 2

Figure 15:
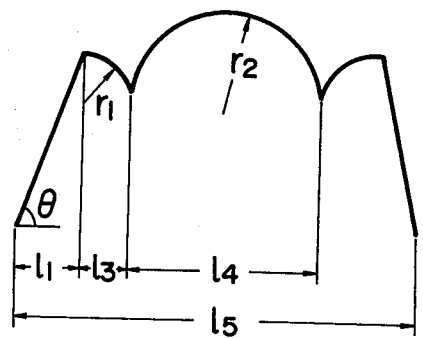
FIG. 15 is an illustration of the shape of lenticules in another embodiment.
Figure 16:
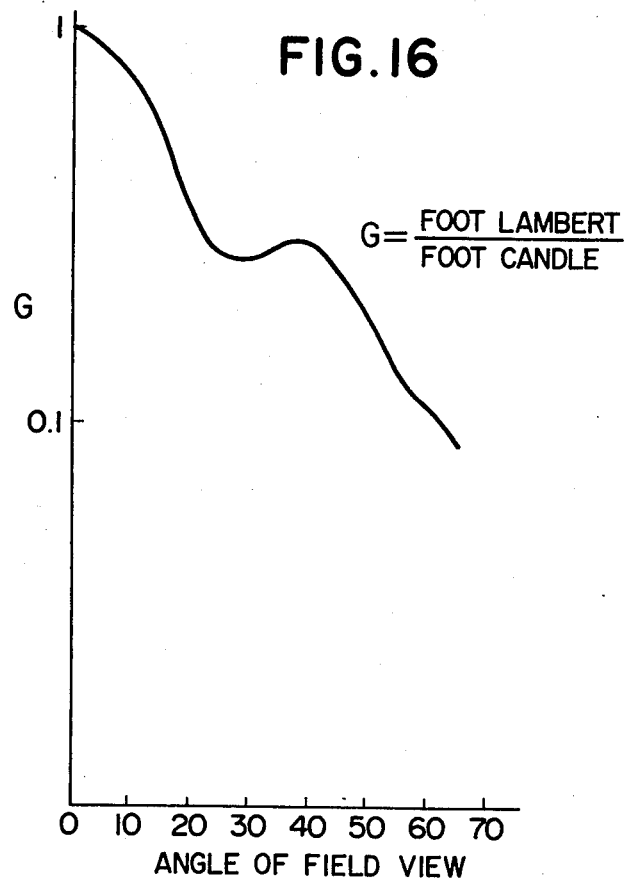
FIG. 16 is a graph showing the result of evaluation of the performance of the second embodiment.

A rear projection screen substantially identical to that shown in FIG. 5 was produced from the same material and by the same method as Example 1. The lenticule unit of this rear projection screen has a form as shown in FIG. 15, and the principal dimensions were as follows: angle $\theta=70°$, distance $l_1=0.125$ mm, distance $l_3=0.25$ mm, distance $l_4=0.7$ mm, distance $l_5=1.2$ mm, radius $r_1$ of curvature=0.135 mm, radius $r_2$ of curvature=0.4 mm, ratio pitch/$r_1$ at the curved surface portion=1.85 and the ratio pitch/$r_2=1.4$. FIG. 16 shows the result of evaluation of the light transmitting characteristics of the thus obtained rear projection screen. From this Figure, it will be seen that the reduction of light quantity is small in the area around 25° and the image can be observed substantially over wide area of 50°. Thus, the rear projection screen of Example 2 showed excellent performance.

EXAMPLE 3

A rear projection screen substantially equal to that shown in FIG. 7 was produced by processing the screen of Example 2 by the process explained before in connection with FIGS. 8A to 8C. More specifically, a strippable paint of polyvinyl alcohol was applied as illustrated in FIG. 8A by a screen printing method on the curved surface portions and convexed lenses of a rear projection screen having a shape as shown in FIG. 13. Then, an aluminum reflecting layer of about 5000Å was formed on the paint layer by a vacuum evaporation method as illustrated in FIG. 8B. Subsequently, a black paint of acrylic resin was applied by spraying onto the aluminum reflecting layer to form an external light absorption layer as shown in FIG. 8C. In this state, the screen was immersed in water to dissolve the masking layer to remove the reflecting layer and external light absorption layer in the associated area. As a result, a rear projection screen substantially equal to that shown in FIG. 7 was obtained. This rear projection screen showed a superior performance as shown in Table 1. Particularly, a sufficiently high contrast was obtained even under application of external light. The screen used for the comparison and appearing in Table 1 was a screen substantially equal to that of Example 2, having lenticules of the same shape and size as those in the screen of Example 3. The comparison screen contained in its material aniline black and phthalocyanine blue as agents for controlling color tone but had no external light absorption layer.

TABLE I

| | measuring angle | | | |
|---|---|---|---|---|
| | Front | | 30° | |
| | external light | | | |
| Sample | no external light | external light of 5001X | no external light | external light of 5001X |
| screen of invention | 45 | 37 | 42 | 21 |
| comparison screen | 42 | 17 | 40 | 3 |

The evaluation of the contrast was made by measuring the levels of brightness in the bright and dark portions and then calculating the ratio of levels of brightness and darkness. Reflected light rays are included in the measurement of brightness when external light rays are applied. The numerical values shown in Table 1 show the values of the ratio. The greater value, therefore, represents higher contrast.

EXAMPLE 4

Figure 17:
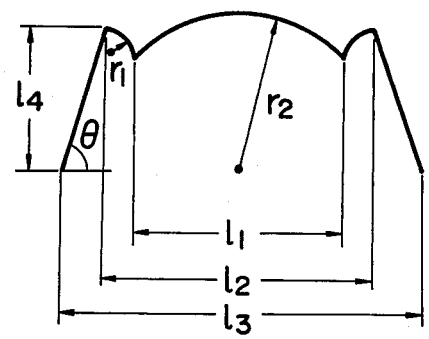
FIG. 17 is a illustration showing a configuration of one example of a lenticular lens unit.
Figure 18:
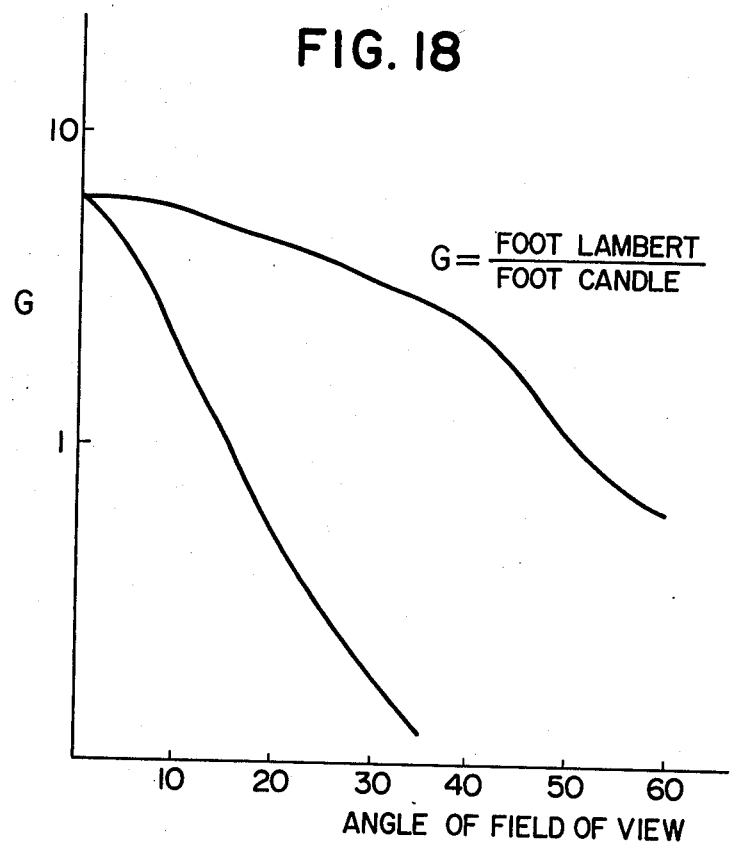
FIG. 18 is a graph showing the results of an evaluation of the performance of another embodiment.
Figure 19:
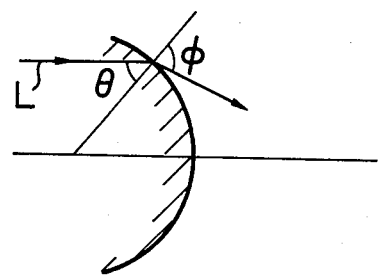
FIG. 19 is an illustration of light transmitting characteristics of an ordinary lenticulated lens.
Figure 20:
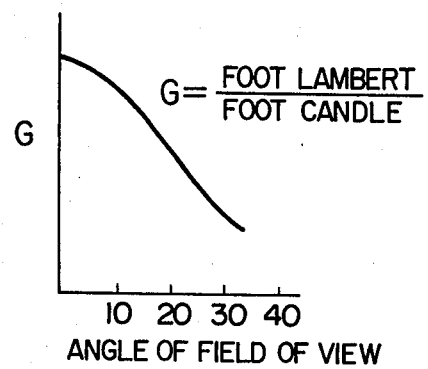
FIG. 20 is a graph showing the light transmitting characteristics as ilustrated in FIG. 19.

A rear projection screen substantially identical to that shown in FIG. 5 was produced from the same material and by the same method as Example 1. The lenticule unit of this rear projection screen had a shape as shown in FIG. 17, and the principal dimensions were as follows: length $l_1=0.72$ mm, length $l_2=0.9$ mm, length $l_3=1.2$ mm, length $l_4=0.47$ mm, angle $\theta=72.5°$, radius $r_1$ of curvature=0.1 mm, radius $r_2$ of curvature=0.5 mm, ratio pitch/$r_1$ at curved surface portion=1.8, ratio pitch/$r_2$ at lens portion=1.44 and pitch of Fresnel lens=0.5 mm. The ratio pitch/$r_1$ at the curved surface portions was obtained as the sum of the values of the two curved surface portions. FIG. 18 shows the result of evaluation of light transmission characteristics of this rear projection screen, the upper curve showing the light distribution in the horizontal diection and the lower curve showing the distribution in the vertical direction. From this Figure, it will be seen that the rear projection screen of this example exhibits a peak gain value of 6.2 and a horizontal $\beta$ value of 42° and showed ideal characteristics in that the light quantity is progressively decreased as the angular field of vision is increased. The image could be observed substantially over wide angular field of vision of 50°. Thus, the rear projection screen of this example proved to have exellent performance.

What is claimed is:

1. A rear projection screen having front and rear surfaces and a light transmitting medium therebetween,
    the screen being adapted to receive light rays at the rear surface and transmit the rays through the medium and cause them to emanate from the front surface,
    the front surface being formed with a plurality of parallel lenticule units arranged to disperse emanating light rays over a wide angle,
    each lenticule unit being formed with a pair of flanks and with a crest having only two curved surfaces, one adjacent to each flank,
    each flank having a portion extending toward the rear surface of the screen which forms an angle greater than the critical angle to the plane of the rear surface so as to provide a total reflection surface to reflect transmitted rays incident on that flank portion and cause them to emanate through the adjacent curved surface.

2. A rear projection screen according to claim 1 wherein the sum of the pitches of the curved surfaces is at least 40% of the pitch of the lenticule unit.

3. A rear projection screen according to claim 2 wherein the sum of the pitches of the curved surfaces is between about 40% and 70% of the pitch of the lenticule unit.

4. A rear projection screen according to claim 1 wherein the total reflection surface includes a curved surface.

5. A rear projection screen according to claim 1 wherein a Fresnel lens is formed on the rear surface of said rear projection screen.

6. A projection screen according to claim 1 wherein a light diffusing material is admixed in the light transmitting medium.

7. A rear projection screen according to claim 1 wherein at least one of the front and rear surfaces is a mat surface.

8. A rear projection screen according to claim 1 including an external light absorption layer on the total reflection surface.

9. A rear projection screen according to claim 8 including a light reflection layer between the external light absorption layer and the total reflection surface.

10. A rear projection screen having front and rear surfaces and a light transmitting medium therebetween,
the screen being adapted to receive light rays at the rear surface and transmit the rays through the medium and cause them to emanate from the front surface,
the front surface being formed with a plurality of parallel lenticule units arranged to disperse the emanating light rays over a wide angle,
each lenticule unit being formed with a pair of flanks and with a crest having at least one curved surface adjacent to each flank,
each flank having a portion extending toward the rear surface of the screen which forms an angle greater than the critical angle to the plane of the rear surface so as to provide a total reflection surface to reflect transmitted rays incident on that flank portion and cause them to emanate through the adjacent curved surface,
the curved surfaces adjacent to the flanks being arranged to transmit light received directly from the rear surface of the screen and disperse it through one angular field and to transmit light reflected from the adjacent flank and disperse it through another angular field.

11. A rear projection screen according to claim 10 wherein the crest includes a convex lens portion between the curved surfaces adjacent to the flanks.

12. A rear projection screen according to claim 11 wherein the surface of the convex lens portion has the shape of an arc of a circle.

13. A rear projection screen according to claim 10 wherein the total reflection surface includes a curved surface.

14. A rear projection screen according to claim 10 wherein a Fresnel lens is formed on the rear surface of said rear projection screen.

15. A rear projection screen according to claim 10 wherein a light diffusing material is admixed in the light transmitting medium.

16. A rear projection screen according to claim 10 wherein at least one of the front and rear surfaces is a mat surface.

17. A rear projection screen according to claim 10 including a further convex lens portion formed between each adjacent pair of lenticule units.

18. A rear projection screen according to claim 10 including an external light absorption layer on the total reflection surface.

19. A rear projection screen according to claim 18 including a light reflection layer between the external light absorption layer and the total reflection surface.

20. A rear projection screen having front and rear surfaces and a light transmitting medium therebetween,
the screen being adapted to receive light rays at the rear surface and transmit the rays through the medium and cause them to emanate from the front surface,
the front surface being formed with a plurality of parallel lenticule units arranged to disperse emanating light rays over a wide angle,
each lenticule unit being formed with a pair of flanks and with a crest having at least one curved surface adjacent to each flank,
each flank having a portion extending toward the rear surface of the screen which forms an angle greater than the critical angle to the plane of the rear surface so as to provide a total reflection surface to reflect transmitted rays incident on that flank portion and cause them to emanate through the adjacent curved surface, and
a light absorbing layer coated on the surface of each flank.

21. A rear projection screen according to claim 20 including a light reflection layer between the external light absorption layer and the total reflection surface.

* * * * *

UNITED STATES PATENT AND TRADEMARK OFFICE
CERTIFICATE OF CORRECTION

PATENT NO. : 4,468,092

DATED : August 28, 1984

INVENTOR(S) : Inoue et al.

It is certified that error appears in the above—identified patent and that said Letters Patent is hereby corrected as shown below:

On first page of patent, under "References Cited" add the following Foreign Patent Documents:

-- 656,651 Great Britain 2,276,605 France --

Signed and Sealed this

Sixteenth Day of April 1985

[SEAL]

Attest:

DONALD J. QUIGG

*Attesting Officer*  *Acting Commissioner of Patents and Trademarks*